Figure 1:
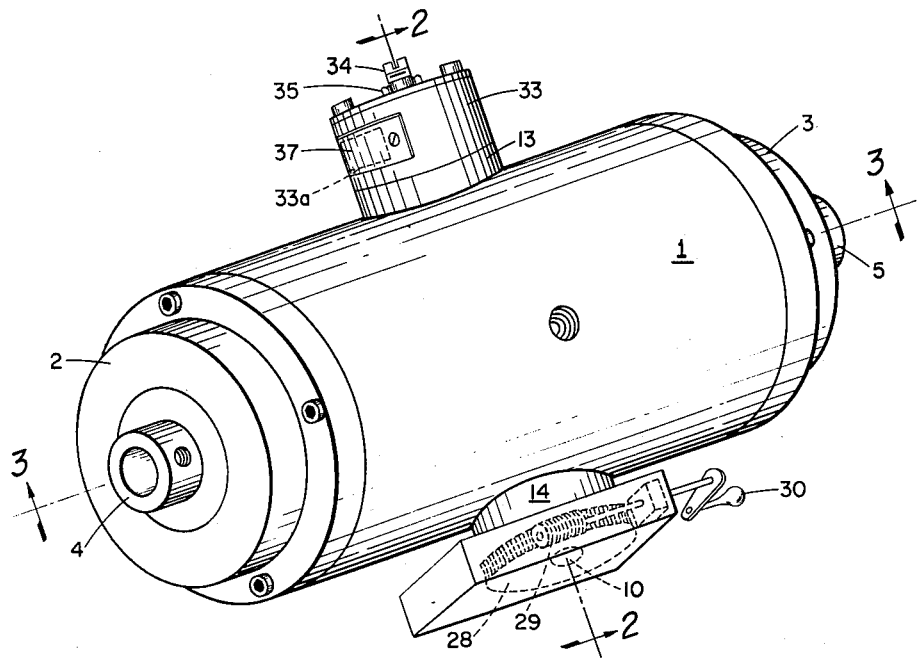

July 19, 1966  C. E. KRAUS  3,261,219
MOTION TRANSMITTING DEVICE
Filed Aug. 21, 1961  4 Sheets-Sheet 1

INVENTOR.
CHARLES E. KRAUS

July 19, 1966

C. E. KRAUS 3,261,219

MOTION TRANSMITTING DEVICE

Filed Aug. 21, 1961

4 Sheets-Sheet 2

INVENTOR.
CHARLES E. KRAUS

United States Patent Office 3,261,219
Patented July 19, 1966

3,261,219
MOTION TRANSMITTING DEVICE
Charles E. Kraus, Franklin Lakes, N.J., assignor to Excelermatic, Inc., a corporation of New York
Filed Aug. 21, 1961, Ser. No. 132,985
7 Claims. (Cl. 74—200)

This is a continuation-in-part of copending application Serial No. 94,777, filed March 10, 1961, now abandoned and assigned to the same assignee as the present application.

This invention relates to motion transmitting devices, and more particularly to speed changing power transmission mechanisms.

It is an object of this invention to provide a new and improved speed changer wherein the output speed is progressively and continuously variable relative to the input or driving speed throughout a wide range of speeds; which has minimum spin characteristics and high efficiency at all loads; and which is rugged, inherently stable, compact in size, embodies a minimum number of parts, is economical to manufacture, and easy to assemble.

In accomplishing the objects of this invention, I have provided in one embodiment of my invention, an assembly in which the adjacent faces of axially aligned input and output drive discs form substantially a spherical cavity concentric with the common axis of the axially aligned discs. In order to transmit rotation between input or driving and output or driven discs, a spool-like device is placed between and in engagement with these faces within the cavity. The spool assembly or device rotates on bearings in a carrier which is journalled on an axis at 90° to and intersecting the drive axis. The axis of rotation of the spool-like device and the drive axis are displaced laterally with respect to each other a small amount and the proportions of the parts are such that the spool assembly contacts at only one point on each spool face and these points of engagement are on the same side of the common axis of the discs. By rotation of the carrier about its pivot axis, the speed ratio may be adjusted through a wide range from reduction to overdrive. In a second embodiment of my invention there is provided a device substantially the same as that described above except that the carrier axis is tilted with respect to the axis of the discs thereby enabling an improved degree of control of the speed ratio of the device.

In a third embodiment, there is again provided a cavity between the adjacent disc faces. This cavity is provided with three sections. The outer sections define partial spheres or are shaped as partial spherical surfaces wherein, in section, the adjacent disc faces lie at least partially on arcs of a circle. The section intermediate the outer sections is generally cylindrical. The centers of curvature of the outer sections are displaced a predetermined distance from the common axis of the discs.

The motion transmitting means is a spool-like member of the type employed in the other embodiments. The member is mounted for pivotal movement about an axis passing through one of the centers of curvature and for rotation about an axis intersecting the pivot axis.

Figure 2:
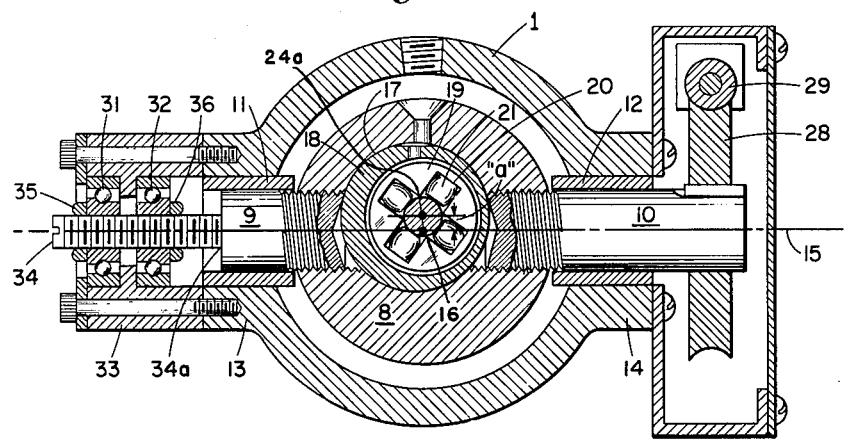
Figure 4:
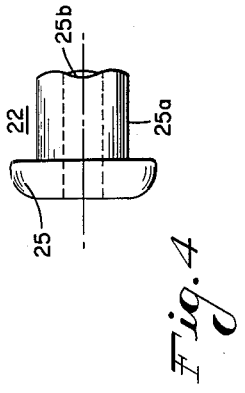

My invention, together with other objects and advantages, will be best understood from the accompanying drawings and description. In this respect FIGURE 1 is a view of an assembled speed changer embodying the principles of my invention in a first embodiment of my invention, FIGURES 2 and 3 are sectional views of the embodiment of FIGURE 1 taken along the lines 2—2 and 3—3, respectively, of FIGURE 1, FIGURE 4 is a side view of a part of the device of FIGURES 1–3 showing cam surfaces for effecting a function of my invention, FIGURE 5 illustrates a modification of the spool-like device, details of which are shown in FIGURES 2–4, inclusive, FIGURES 6 and 7 represent a second embodiment similar to that of FIGURES 1–4, inclusive, and FIGURES 8–10, inclusive, illustrate in diagrammatic form three arrangements of a third embodiment of my invention.

Referring to the drawings, there is shown a power transmission unit comprising a casing 1 having suitable end numbers 2 and 3. Input or drive shaft 4 and output or driven shaft 5 are suitably journalled in respective members 2 and 3 for rotation in axial alignment. The inner, adjacent ends of shafts 4 and 5 carry oppositely disposed, generally concave discs 6 and 7, respectively. The discs are axially aligned and shaped so that their adjacent surfaces define substantially a spherical cavity concentric with the axis of the transmission. While the discs are shown in the illustrated embodiment as axially related to shafts 4 and 5, they may be suitably carried for rotation in any manner and the drive and driven shafts may be connected through gearing or any other suitable means and may be displaced relatively to the discs and each other.

In order to transmit rotary motion between drive shaft 4 and driven shaft 5, there is provided a spool carrier 8 which is pivotally mounted within the cavity by means of oppositely directed pivot members 9 and 10 supported within sleeve bearings 11 and 12, respectively, which in turn are suitably secured within openings in outwardly extending portions 13 and 14, respectively, of casing 1.

Figure 3:
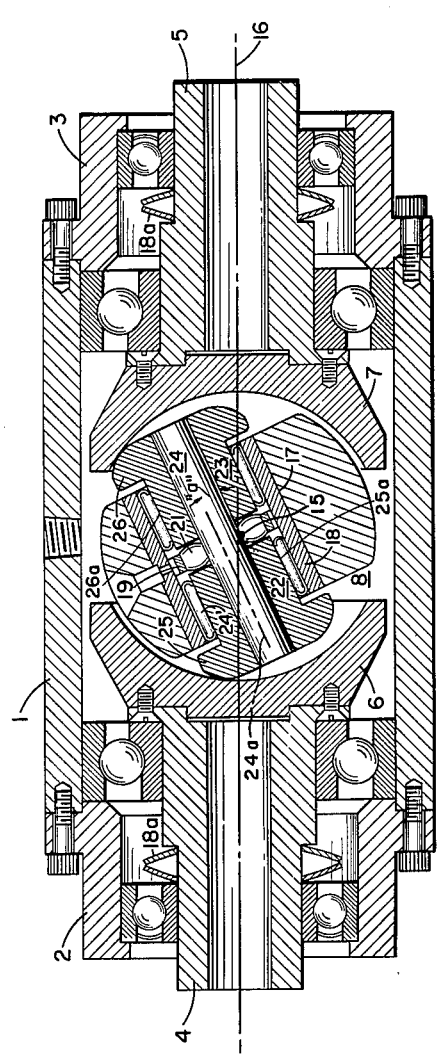

The carrier or cross axis 15 of carrier 8 intersects axis 16 of the shafts of the device and the discs and the axis 24a of the spool member is displaced laterally a predetermined relatively small amount with respect to the center of the toric cavity, i.e., axes 15 and 16, as indicated by the latter "a," in FIG. 3.

Carrier 8 is bored to provide an eccentically disposed opening 17 through the carrier within which is disposed an eccentric member 18. Member 18 carries a cage 19 having openings 20 to receive solid force transmitting members such as barrel-shaped rollers 21 (four such rollers are shown in FIG. 2) and a spool assembly comprising separate spool-like members 22 and 23 mounted on a shaft or pin 24. The spool members comprise outer disc engaging portions 25, 26 and inwardly directed body portions 25a, 26a of smaller diameter than portions 25, 26. The spool members are mounted for rotation in bearings 24' with respect to each other. One member may be secured, as, for example, by a set screw (not shown) to shaft 24 while the other is left free to rotate about shaft 24.

The adjacent ends of spool portions 25a and 26a are provided with cam surfaces as indicated by the numeral 25b in FIG. 4. The cam surfaces cooperate with the rollers 21 to force spool portions 25 and 26 into firm engagement with discs 6 and 7 as member 22 rotates relative to member 23 and rollers 21 ride up the inclined cam surfaces or faces of the spool members, thereby providing a form of sprag loading. With this arrangement, there is developed an axial force tending to separate members 22 and 23 which is proportional to the tangential force applied by the input disc to the input spool member 22 and by the output spool member 23 to the output disc 7. Because the force is always applied to the spool members at the same point or radius, the axial force is always proportional to the tangential force.

In order to select a desired drive ratio, means is provided for rotating carrier 8 and spool members 22 and 23 about axis 15. Such means is shown in FIGS. 1 and 2 wherein there is shown a worm wheel 28 mounted on pivot member 10 and a worm 29 suitably mounted for rotation by crank 30.

By reason of the off-set indicated by a letter "a" and the dimensions of the parts, both contacts of the spool members with discs 6 and 7 lie on the same side of axis 16, i.e., the common axis of the discs.

Means is provided for preloading the assembly described above in the form of a pair of Belleville springs 18a.

The spool carrier under no-torque conditions finds center easily. The slightest "wiggle" results in self-centering. Referring to FIG. 3, when the unit is loaded, longitudinal or axial forces, as well as tangential forces on a plane perpendicular to the plane of the drawing, result in a tendency to develop a precessing force which is, even with minimum motion, capable of creating a tendency to walk the spool carrier off center.

Means may be provided for preventing such precessing of the spool carrier and to hold or lock the assembly on center. In FIG. 2, one such means comprises a pair of thrust bearings 31 and 32 carried on the threaded element 34 within housing 33 and suitably threaded into bore 34a in pivot member 9. The bearings are secured in place by adjustment nuts 35 and 36. To enable adjustment of nut 36, an opening 33a is provided through housing 33. A suitable removable cover 37 is provided for opening 33a.

With the arrangement shown, a very wide range of speed ratios is obtainable. In FIG. 3, the parts are disposed for substantially maximum reduction. The input engagement path can be brought very close to the center of disc 6, in which case there would be no drive at all since spool member 22 would not be rotated, i.e., the ratio approaches infinity. Similarly, the input engagement path can be moved to the outer edge of disc 6, whereby the engagement path of member 23 approaches axis 16 and maximum speed-up or overdrive is achieved.

For simplicity, this drive has been illustrated and described as having the input and output shafts on a common axis but it is apparent that the shaft axes may be swung relative to each other about the center of the spherical cavity a reasonable amount without interfering with the proper action of the drive or otherwise displaced.

In the arrangement shown in FIGS. 1–4 inclusive, there is provided, as noted above, a form of sprag loading. The cam action between the cam surfaces of the spool members and rollers 21 multiplies the torque at the traction points. In order to minimize any likelihood of seizure, the rollers may be replaced, where the intended use of the device makes it preferable, by resilient or spring means, such as a pair of Belleville springs 39, 40 as shown in FIG. 5. Means, e.g., a key (not shown in the drawings) are provided to prevent relative rotation of rollers 25 and 26. The springs should be designed such that the contact forces will not exceed the capability of the spin contact. This arrangement permits maintained contact force which enables the output to go to zero, i.e., achieve perfect spin, because the danger of the torque multiplying at the traction points to such a degree as to cause seizure is substantially eliminated.

In the embodiment of FIGS. 6 and 7, there is provided a modification which is generally similar to the view of the first described embodiment shown in FIG. 2. Pivot member 9' is mounted for motion in a roller bearing assembly comprising an outer roller race 41, an eccentric member 42 and an inner roller race 43. Pivot member 10' is similarly mounted in outer race 44, eccentric member 45, and inner race 46.

Eccentric members 42 and 45 are bored to provide axial alignment and are so bored that the axes of members 9' and 10' are co-axial and pivot about a carrier axis 15' which is tilted or displaced angularly with respect to the center line 47 of the bearing assemblies. The angle between axis 15' and center line 47 should be substantial and may be of the order of 3°. The eccentric members may be secured to yoke 48, as by screws 49'.

This arrangement permits less care in construction than required of the construction shown in FIGS. 1–4 and results in minimum tendency for the spool assembly to walk.

The embodiment of FIGS. 6 and 7 is provided with means for controlling the speed ratio of the device. The extended end of member 10' carries an arm 49 which extends to a position intermediate stops 50 secured to the outside of the casing.

There is also provided a control arm 51 which may be turned to the position to give the desired speed ratio. This movement is translated by means of shaft 52 through casing 1 to a crank arm 53 having a projection 54 which extends into opening 55 in yoke 48. Thus rotation of arm 51 effects pivotal movement of yoke 48 in a direction perpendicular to the plane of the drawing about its ends 48a and 48b secured, as previously stated, to bearing members 42 and 45. The resulting tilting of the spool assembly causes walking or pivoting of the assembly about members 9' and 10' until arm 49 engages one of the stops 50, depending upon the direction of movement of control arm 51.

Figure 8:
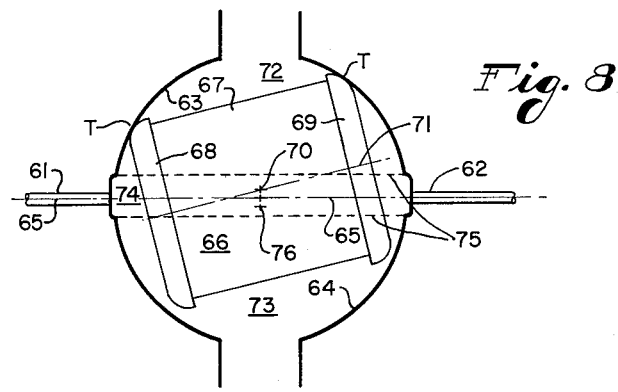

Referring to FIG. 8, there is represented a power transmission or motion transmitting device comprising an input or driving shaft 61, and an output or driven shaft 62. The inner, adjacent ends of these shafts carry oppositely disposed discs 63 and 64, respectively. In the illustrated embodiments, the discs are axially aligned and the common axis is indicated by the numeral 65. The axes of the discs need not be co-axial, however, but must intersect at the center of the cavity later described.

In order to transmit rotary motion between discs 63 and 64, there is provided a spool-like member 66. For details thereof, reference is made to the embodiment of FIGS. 1 to 4. For the purposes of this application, member 66 has a body portion 67 and a pair of enlarged disc engaging outer portions 68 and 69 which have substantially point engagement with discs 63 and 64, as indicated by the letter "T".

In order to permit selective adjustment of the speed ratio of the input and output shafts, member 66 is mounted for pivotal movement about an axis 70, which is normal to the plane of the drawings in the illustrated embodiments. Member 66 must be arranged for rotation in order to effect rotation of the output shaft. For this purpose, member 66 is arranged for rotation about axis 71 which, as shown in FIG. 8, intersects axis 70.

Figure 9:
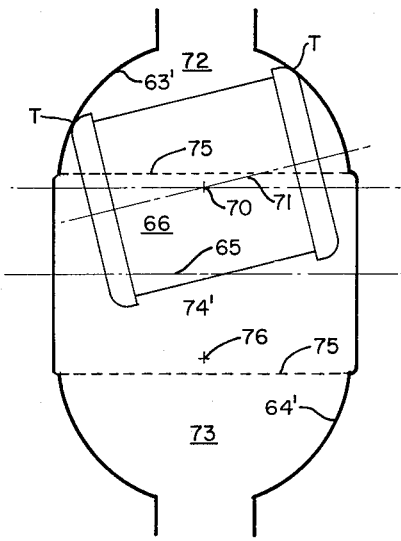

The adjacent faces of discs 63 and 64 define a cavity having partially spherically shaped outer sections 72 and 73 and a generally cylindrically shaped intermediate section 74. In the embodiments of FIGS. 8 and 9, sections 72 and 73 are approximately hemi-spherical. In FIG. 8, the limits of section 74 are indicated by the dashed lines 75. The limits are similarly indicated in FIG. 9, and in FIG. 10, the limits are shown by the dashed lines 75'.

The partially spherical section 72 is generated from a center of curvature coinciding with axis 70. The center of curvature corresponding to section 73 is represented by numeral 76. Centers 70 and 76 are equally displaced on opposite sides of axis 65.

Referring to FIG. 9, there is shown an embodiment which differs from that of FIG. 8, only in that intermediate section 74' of the cavity between discs 63' and 64' is of substantially greater longitudinal extent than in FIG. 8. Hence, the displacement of points 70 and 76 is correspondingly greater.

Figure 10:
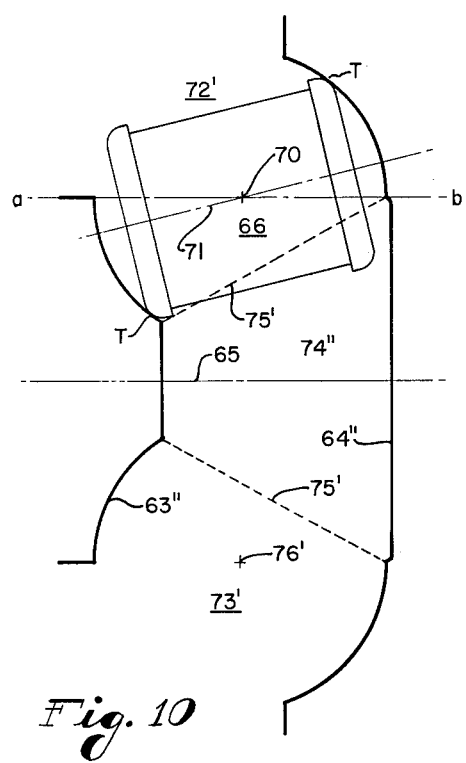

FIG. 10 represents a substantially differently shaped cavity although the adjacent member-engaging surfaces of the discs define, as in the other embodiments, sections which are partially spherical. In the drives of FIGS. 8 and 9, the traction points T—T are on the same side of the axis of rotation of member 66 whereas in FIG. 10, the faces of the discs are so disposed that traction points T—T are on opposite sides of axis 71. Further, in FIGS. 8 and 9, the adjacent faces of the discs are matching whereas those of discs 63″ and 64″ are not. Moreover, in FIG. 10, the intermediate section 74″ is no longer uniformly dimensioned in the longitudinal direction but is shorter on the side of discs 63″ and section 74″ is displaced to the right with respect to the centers of curvature 70 and 76 as compared with FIGS. 8 and 9. FIG. 10 discloses an embodiment which is of the toric type and the traction surfaces lie predominantly on opposite sides of a toric diameter indicated by the line a–b.

I claim:

1. In a speed changer having driving and driven coaxially aligned discs, the adjacent faces of said discs defining substantially a spherically cavity, and means engaging said adjacent faces for transmitting motion from the driving to the driven disc, said motion transmitting means being mounted for selective pivotal movement about an axis normal to the common axis of said discs, said motion transmitting means also being mounted for motion-transmitting rotation within said cavity about an axis which is displaced laterally from the center of said cavity a distance sufficient to establish rolling contact between said means and both of said discs on the same side of said common axis, said normal axis being displaced angularly with respect to the center line of said motion transmitting means.

2. In a speed changer having opposed driving and driven discs, the opposed faces of said discs being shaped to form substantially a spherical cavity concentric with the axis of said discs; and means engaging said opposed faces for transmitting motion from said driving to said driven disc; said means being mounted for rotation in a carrier pivotally carried between said opposed faces on an axis normal to the common axis of said discs and with the axis of rotation of said means being laterally displaced therefrom a predetermined amount; said means comprising a pair of members, each having an inwardly extending body portion and an enlarged outer disc-engaging portion; one of said members being free to rotate with respect to the other of said members; and means disposed between adjacent ends of said members for causing said members to tend to contact said discs with a force proportional to the tangential force of said driving disc on that member engaged thereby.

3. In a speed changer having axially aligned driving and driven discs; the adjacent faces of said discs being disposed to define a substantially spherical cavity concentric with the common axis of said discs; and means engaging said adjacent faces for transmitting motion from said driving to said driven disc; said means comprising a spool carrier pivotally mounted within said cavity on an axis normal to and intersecting said common axis; said carrier being provided with an eccentrically disposed opening therethrough transversely of said pivotal axis; a cylindrical member in said opening; said cylindrical member having a second eccentrically disposed opening therethrough in a direction substantially parallel to the direction of said first-mentioned opening, the axis thereof being laterally displaced with respect to said intersecting axis a predetermined amount; a spool-shaped assembly mounted in association with said second opening and comprising a pair of axially aligned members disposed on said laterally displaced axis, each member having an inwardly extending body portion extending into said second opening and an enlarged outer disc-engaging portion extending beyond said carrier; said members being arranged for rotation about the axis thereof; and means disposed between adjacent ends of said members for causing said members to tend to contact said discs with a force proportional to the tangential force of said driving disc on that member engaged thereby.

4. The speed changer of claim 2 in which the members are axially aligned, the opposing faces of said adjacent ends of said members have cam surfaces, and said means disposed between said adjacent ends comprises at least one solid force transmitting member disposed to engage said cam surfaces.

5. The speed changer of claim 2 in which the members are axially aligned, the opposing faces of said adjacent ends of said members have cam surfaces, and said means disposed between said adjacent ends comprises a plurality of rollers engaging said cam surfaces.

6. In a speed changer having driving and driven, coaxially-aligned discs, the adjacent faces of said discs defining substantially a spherical cavity, and means engaging said adjacent faces for transmitting motion from the driving to the driven disc, said motion transmitting means being mounted for selective pivotal movement about an axis normal to the common axis of said discs, said motion transmitting means also being mounted for motion transmitting rotation with said cavity about an axis which is displaced laterally from the centre of said cavity a distance sufficient to establish rolling contact between said means and both of said discs on the same side of said common axis, said motion transmitting means comprising a pair of oppositely directed coaxially aligned pivot members, a pair of bearing assemblies, each of said assemblies being bored for receiving and pivotally supporting the respective pivot members, the bores through said assemblies being coaxial, the axis of said bores and hence the axis of said pivot members being disposed at an angle with respect to the center line of said assemblies.

7. In a speed changer having driving and driven discs, means engaging the adjacent faces of said discs for transmitting motion from the driving to the driven disc said means being mounted for rotation in a carrier pivotally carried between said adjacent faces on an axis normal to the common axis of said discs with the axis of rotation of said means being laterally displaced therefrom a predetermined amount, said motion transmitting means also comprising two members, one of said members being free to rotate with respect to the other of said members, said members being arranged for movement into engagement with the respective disc, each member having a camming surface, and anti-friction elements disposed between and engaging said surfaces whereby the wedging action between the anti-friction elements and the cam surfaces during relative rotation between said two members causes movement thereof such that said members tend to contact said discs with a force proportional to the tangential force of said driving disc on that member engaged thereby.

References Cited by the Examiner

UNITED STATES PATENTS

| | | | |
|---|---|---|---|
| 944,872 | 12/1909 | Jenkins | 74—200 |
| 1,947,044 | 2/1934 | Gove | 74—200 |
| 2,571,851 | 10/1951 | Floyd et al. | 74—208 X |
| 3,048,047 | 8/1962 | Richardson | 74—200 |

FOREIGN PATENTS

| | | |
|---|---|---|
| 936,000 | 2/1948 | France. |
| 765,767 | 7/1954 | Germany. |
| 808,662 | 7/1951 | Germany. |
| 812,618 | 9/1951 | Germany. |
| 835,678 | 4/1952 | Germany. |

MILTON KAUFMAN, *Primary Examiner.*

BROUGHTON G. DURHAM, *Examiner.*

T. W. SHEAR, *Assistant Examiner.*